United States Patent
Lee

(10) Patent No.: US 8,448,765 B2
(45) Date of Patent: May 28, 2013

(54) BI-DIRECTIONAL COUPLING WITH AXIAL DISENGAGEMENT

(75) Inventor: Brian Lee, York, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 788 days.

(21) Appl. No.: 12/567,156

(22) Filed: Sep. 25, 2009

(65) Prior Publication Data

US 2010/0126818 A1  May 27, 2010

Related U.S. Application Data

(60) Provisional application No. 61/116,938, filed on Nov. 21, 2008.

(51) Int. Cl.
*F16D 15/00* (2006.01)

(52) U.S. Cl.
USPC .............................................. 192/38; 192/65

(58) Field of Classification Search
USPC .................. 192/38, 65, 78; 464/167
See application file for complete search history.

(56) References Cited

U.S. PATENT DOCUMENTS

| | | | | |
|---|---|---|---|---|
| 2,291,151 | A * | 7/1942 | Dunn | 192/38 |
| 2,743,804 | A * | 5/1956 | Roberts | 192/48.91 |
| 3,279,571 | A * | 10/1966 | Wassilieff | 192/38 |
| 3,476,226 | A * | 11/1969 | Massey | 192/27 |
| 4,254,639 | A * | 3/1981 | Teramachi | 464/167 |
| 6,409,001 | B1 | 6/2002 | Kerr | |
| 6,761,503 | B2 | 7/2004 | Breese | |
| 7,037,200 | B2 * | 5/2006 | Dorrie et al. | 464/35 |
| 2010/0024582 | A1 * | 2/2010 | Fitzgerald | 74/339 |

* cited by examiner

*Primary Examiner* — Richard M. Lorence

(74) *Attorney, Agent, or Firm* — Fitzpatrick, Cella, Harper & Scinto

(57) ABSTRACT

Example aspects of the present invention comprise two concentric rings, the rings movable relative to each other and defining a clearance between them for receiving at least one ball. The first ring is a coupling member, the second ring is a tubular slipper with a friction surface on the far side of the clearance, and the ball contacts the coupling member to the tubular slipper. At least one ring has a first recess with side walls for receiving the least one ball, and the friction surface is configured to displace in a radial direction when the at least one ball is axially aligned with the first recess and forced to run up the side walls by rotating the rings relative to one another. In an example embodiment of the invention, the first recess is a calotte.

15 Claims, 3 Drawing Sheets

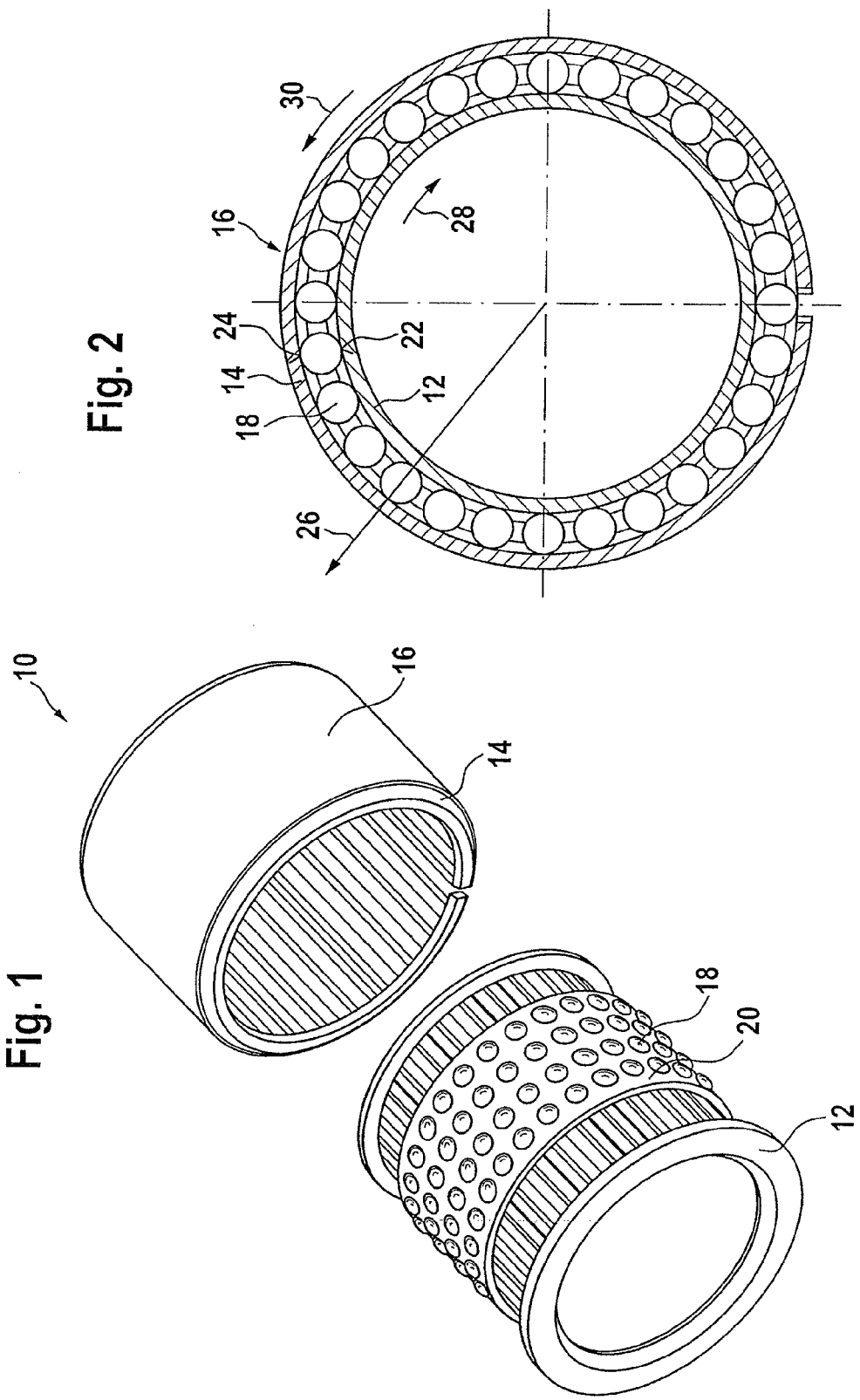

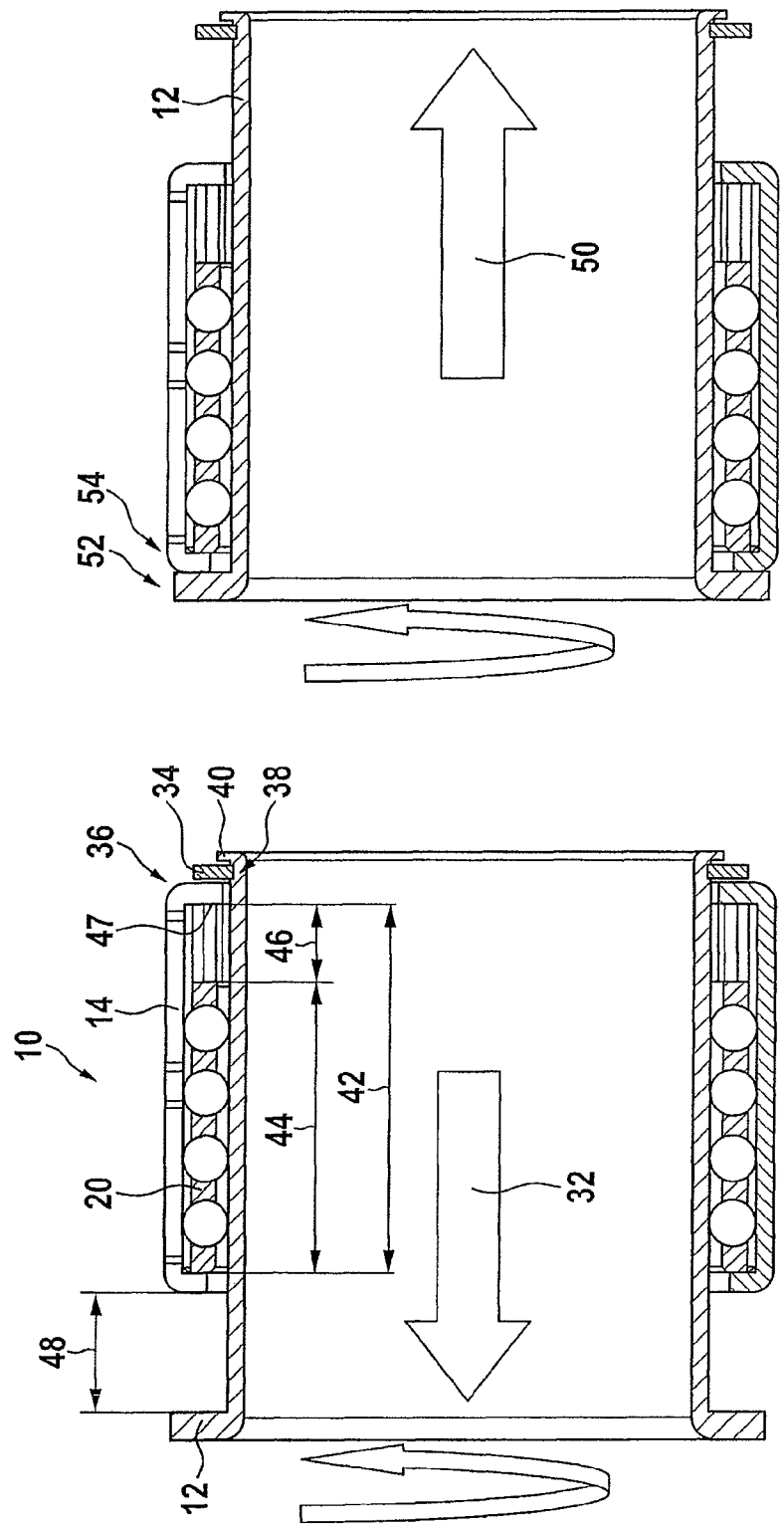

BI-DIRECTIONAL COUPLING WITH AXIAL DISENGAGEMENT

This application claims the benefit of provisional U.S. Application No. 61/116,938, filed Nov. 21, 2008, which is hereby incorporated by reference, as if set forth fully herein.

FIELD OF THE INVENTION

The invention relates generally to a bi-directional coupling, and more specifically to a bi-directional clutch with axial disengagement.

BACKGROUND OF THE INVENTION

Couplings are commonly used to transmit torque from one rotating body to another body. Sometimes it is desirable to incorporate axial compliance in the coupling to allow the rotating bodies to move relative to one another. In this type of coupling, the two rotating bodies are rotationally fixed and axially movable. One application for this type of coupling is a driveshaft for a motor vehicle.

U.S. Pat. No. 6,761,503 (Breese), hereby incorporated by reference in its entirety as if set forth fully herein, discloses a splined member for use in a slip joint for transmitting rotational force between two members, while accommodating a limited amount of relative axial movement therebetween. The slip joint includes a female splined member with a female tubular member and a plurality of elongated rods; a male member with a plurality of circumferentially spaced, longitudinally extending grooves; a plurality of balls disposed in the grooves; and a cage that retains the balls in a fixed relation to one another and limits the travel of the balls in the grooves. The balls engage the rods in a circumferential direction to transmit torque between the female member and the male member, while facilitating unencumbered telescopic displacement between the members.

Breese is limited in that the members are always rotationally fixed. That is, the female member and the male member cannot be disengaged from one another. Sometimes it is desirable to have a disengageable coupling, for example to change gears in a transmission. Often a combination of synchronizer rings and dog clutches are used to engage and disengage the trans-mission gears. This combination requires a considerable amount of axial space in the transmission.

U.S. Pat. No. 6,409,001 (Kerr), hereby incorporated by reference in its entirety as if set forth fully herein, discloses a multi-directional coupling including a tubular slipper, a tubular member, a race, and roller members disposed in a channel defined by the tubular slipper and the tubular member. Torque applied to the member forces the rollers to roll up the side walls of the channels, forcing the slipper to radially expand, thereby increasing the radial force exerted on the slipper against the race. As more torque is applied to the member, the slipper and the race will become rotationally locked to the member.

Kerr further includes a tapered spigot and a channel extending through the slipper and member. When the spigot is partially inserted into the channel, the coupling responds as described above. When the spigot is fully inserted into the channel, the member is prevented from rotating relative to the slipper, allowing the race to freewheel. However, Kerr is limited in that once engaged, the coupling cannot be easily disengaged while torque is applied to the member. That is, in order to reduce the radial force exerted on the slipper against the race, the slipper must rotate opposite to the member and against the torque being transmitted. Furthermore, the rollers in the Kerr design do not permit axial displacement of the tubular slipper relative to the tubular slipper.

Thus, there is a long-felt need for a disengageable coupling which permits axial displacement. There is also a long-felt need for a disengageable coupling that can be easily disengaged while transmitting torque.

BRIEF SUMMARY OF THE INVENTION

Example aspects of the present invention comprise two concentric rings, the rings movable relative to each other and defining a clearance between them for receiving at least one ball. The first ring is a coupling member, the second ring is a tubular slipper with a friction surface on the far side of the clearance, and the ball contacts the coupling member to the tubular slipper. At least one ring has a first recess with side walls for receiving the least one ball, and the friction surface is configured to displace in a radial direction when the at least one ball is axially aligned with the first recess and forced to run up the side walls by rotating the rings relative to one another. In an example embodiment of the invention, the first recess is a calotte (i.e., a round cavity or depression).

In some example embodiments of the invention, at least one of the coupling member and the tubular slipper has a second recess axially disposed from the first recess, and the friction surface is configured to not displace in a radial direction when the at least one ball is axially aligned with the second recess and the coupling member and the tubular slipper are rotated relative to one another. In an example embodiment of the invention, the at least one ball is a plurality of balls forming single or multiple rows in a sheet metal ball cage.

Also, in some example embodiments of the invention, the coupling member or the slipper or both include the first recess. In some example embodiments of the invention, the rings include multiple first recesses circumferentially displaced, the first recesses are radially aligned, and the side walls of the first recess have an arched shape. In some example embodiments of the invention, one of the rings has a bordered flange for limiting the axial movement of the rings.

In some example embodiments of the invention, a cylindrical roller element is placed in the clearance axially next to the at least one ball. The ball is elastic and has a slightly bigger diameter than the diameter of the cylinders, so that an axial movement between the rings in unencumbered condition is carried only by the balls, and the cylindrical roller elements carry the load in the charged state.

An example method of the invention comprises axially aligning a plurality of balls in a first arched recess of at least one of a coupling member and a tubular slipper, arranged concentrically; and rotating at least one of the coupling member and the tubular slipper to apply a radial force to at least one of the coupling member and the tubular slipper. Another example method of the invention further comprises axially aligning the plurality of balls in a second recess to eliminate the radial force.

A better understanding of these and other aspects, features, and advantages of the invention may be had by reference to the drawings and to the accompanying description, in which example embodiments of the invention are illustrated and described.

BRIEF DESCRIPTION OF THE DRAWINGS

The nature and mode of operation of example aspects of the present invention will now be more fully described in the following detailed description of the invention taken with the accompanying drawing figures.

FIG. 1 is an exploded view of a coupling design according to an example aspect of the invention.

FIG. 2 is a section view of the coupling of FIG. 1 taken perpendicular to the rotational axis.

FIG. 3 is a section view of the coupling of FIG. 1 taken parallel to the rotational axis, wherein the coupling is shown in a first axial position.

FIG. 4 is the section view of FIG. 3, wherein the coupling is shown in a second axial position.

DETAILED DESCRIPTION OF THE INVENTION

Figure 5:
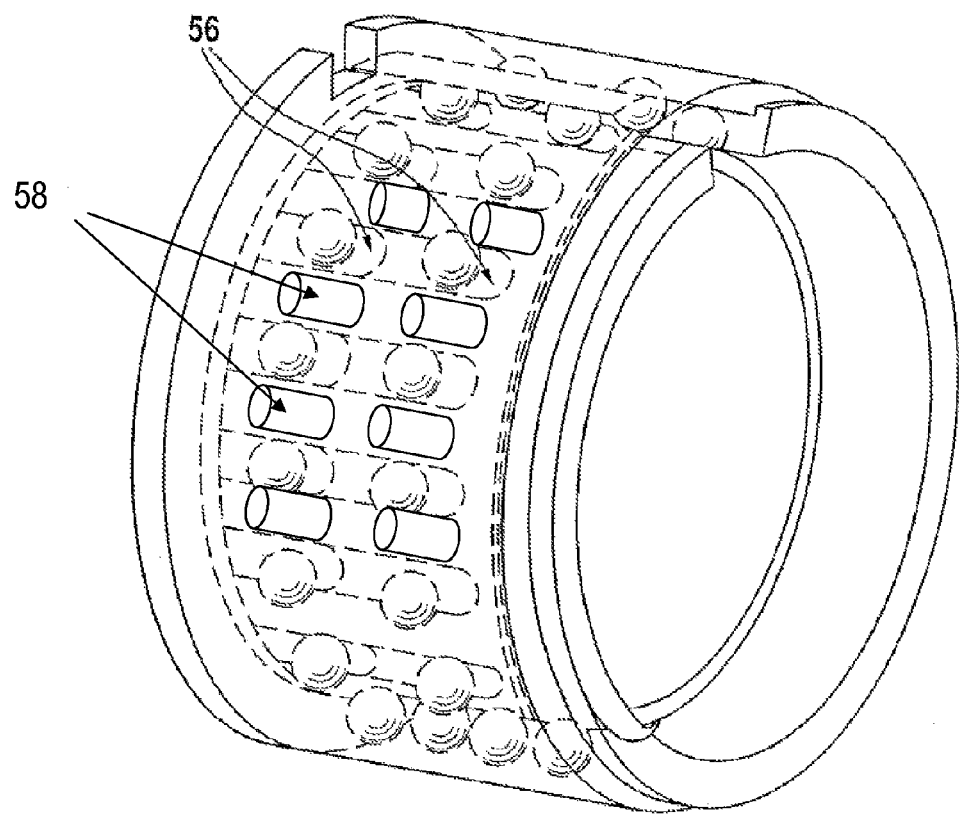
FIG. 5 is a perspective view of an example embodiment of the coupling including a disengagement recess and a cylindrical roller element according to an aspect of the invention.

At the outset, it should be appreciated that like drawing numbers on different drawing views identify identical, or functionally similar, structural element of the invention. Furthermore, it is understood that this invention is not limited to the particular embodiments, methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following methods, devices, and materials are now described.

FIG. 1 is an exploded view of a coupling design according to an example aspect of the invention, and FIG. 2 is a section view of the coupling of FIG. 1 taken perpendicular to the rotational axis. The following description is made with reference to FIGS. 1 and 2.

Coupling assembly 10 includes coupling member 12, tubular slipper 14 with friction surface 16, balls 18. Member 12 and slipper 14 are concentric rings with clearance between them for receiving balls 18. Optional ball race 20 is concentrically disposed between member 12 and slipper 14. Race 20 is a cylindrical tube with holes for positioning multiple rows of balls 18 relative to one another. Balls 18 can freely rotate within the positioning holes. Any number and arrangement of balls, i.e., a single ball or one or more rows of balls, and any suitable number of and/or circumferential distribution of balls per row are within the spirit and scope of the invention.

An example embodiment includes a cylindrical roller element 58 (FIG. 5) disposed axially adjacent ball 18. The roller element 58 has a diameter slightly smaller than ball 18, but ball 18 is elastic. Therefore, axial movement between rings 12 and 14 in an unencumbered (unlocked) condition is carried only by balls 18, but in the charged (locked) state, the cylindrical roller elements 58 carry the load.

Coupling member 12 includes arched recess 22 (FIG. 2). Tubular slipper 14 includes arched recess 24 (FIG. 2). Recesses 22 and 24 are designed to receive ball 18 therebetween. In an example embodiment, recess 22 and/or recess 24 is a calotte. Although recesses 22 and 24 are shown in member 12 and slipper 14, respectively, in other embodiments only one such recess may be present. For example, recess 22 may not be present in coupling member 12. Likewise, recess 24 may not be present in tubular slipper 14.

Friction surface 16 is configured to displace in a radial direction, i.e., direction 26 when balls 18 are disposed in recesses 22 and 24 and coupling member 12 and tubular slipper 14 are rotated relative to one another. For example, when member 12 is rotated in direction 28 and slipper 14 rotates in direction 30, balls 18 are forced against walls of recesses 22 and 24, causing balls 18 to apply radial force to slipper 14, thereby displacing slipper 14 in direction 26. The same discussion applies when member 12 is rotated in direction 30 and slipper 14 is rotated in direction 28.

FIG. 3 is a section view of the coupling of FIG. 1 taken parallel to the rotational axis, wherein the coupling is shown in a first axial position. FIG. 4 is the section view of FIG. 3, wherein the coupling is shown in a second axial position. The following description is made with reference to FIGS. 1-4.

FIG. 3 depicts tubular member 12 in a first axial position indicated by arrow 32. Retaining ring 34 prevents member 12 from sliding past distal end 36 of slipper 14 in direction 32. Ring 34 may be a snap ring or any other style of retaining ring known in the art. Axial position of ring 34 is maintained, relative to member 12 by groove 38 and radially formed portion 40. Therefore, axial travel of member 12 relative to slipper 14 is limited by ring 34.

Inside length 42 of slipper 14 is the sum of length 44 of race 20 and gap 46 between race 20 and inside surface 47 of distal end 36. In order to facilitate free axial motion of member 12, gap 46 can be at least half as long as travel distance 48. Because locking members 18 are balls, member 12 can move axially relative to slipper 14 when coupling 10 is transmitting torque. That is, the spherical nature of balls 18 allow axial displacement of coupling member 12 relative to slipper 14, while maintaining radial force on slipper 14 through contact of balls 18 with recesses 22 and 24.

FIG. 4 depicts tubular member 12 in a second axial position indicated by arrow 50. In this position, ring 34 is displaced axially, in direction 50 away from distal end 36 of slipper 14. Also, in FIG. 4, gap 46 is reduced because race 20 has displaced in direction 50 with balls 18. In general, race 20 moves about half as far as member 12 when member 12 slides axially in direction 50. Radially formed portion 52 of member 12 prevents member 12 from sliding past distal end 54 of slipper 14. Bordered flange 52 limits the axial movement of the rings.

In operation, member 12 may be engaged with a shaft (not shown) and slipper 14 may be inserted into a gear (not shown). Rotation of member 12 relative to slipper 14 results in radial displacement of friction surface 16 to engage slipper 14 with the gear (not shown). When the slipper and gear are engaged, torque from the shaft is transferred through coupling assembly 10 to the gear. To prevent engagement of the gear, a pin (not shown) may be inserted to prevent rotational motion between member 12 and slipper 14.

Axial displacement of member 12 relative to slipper 14 on balls 18 allows reduced friction motion of the gear relative to the shaft under torque loading. In a typical splined arrangement of a gear and a shaft, significant friction forces must be overcome when sliding a splined gear on a splined shaft.

FIG. 5 is a perspective view of an example embodiment of the coupling including at least one disengagement recess according to an aspect of the invention. In this embodiment, coupling member 12 includes at least one recess 56 axially disposed from one or more recesses 22. Recess 56 is deeper than recess 22 in one example, although it need not be. Although recesses 56 are shown in member 12 and the depth of recess 56 is shown as being greater than the depth of recess 22, recess 56 may be present in slipper 14 as well, in which case the depth of recess 56 would be greater than the depth of recess 24. In one example, recess 56 may not be present in coupling member 12. Likewise, recess 56 may be present in both coupling member 12 and tubular slipper 14.

Here, additional depth of recess 56 prevents balls 18 from contacting slipper 14 when balls 18 are disposed in recess 56. Therefore, in that case the friction surface 16 does not displace in direction 26 when balls 18 are disposed in recess 56 and coupling member 12 and tubular slipper 14 are rotated relative to one another. Stated another way, rotation of coupling member 12 relative to tubular slipper 14 is ineffective to displace friction surface 16 because in that case recess 56 allows balls 18 situated therein to avoid contact with edges of recess 24.

According to another example aspect of the invention, a method of operating a coupling is provided that comprises axially aligning a plurality of balls (e.g., balls 18) in a first arched recess (e.g., recess 22) and rotating a coupling member (e.g., member 12) relative to a tubular slipper (e.g., slipper 14) to apply a radial force to a friction surface (e.g., surface 16). In some example embodiments, the method also includes axially aligning the plurality of balls in a second recess (e.g., recess 56) to eliminate the radial force.

Although example aspects of this invention have been described in certain specific embodiments, many additional modifications and variations would be apparent to those skilled in the art. It is therefore to be understood that this invention may be practiced otherwise than as specifically described. Thus, the present example embodiments of the invention should be considered in all respects as illustrative and not restrictive.

What I claim is:

1. A coupling comprising:
two concentric rings having a common axial direction, the rings being movable relative to each other and defining a clearance between them extending in the common axial direction for receiving at least one ball, the first ring being a coupling member, the second ring being a tubular slipper with a friction surface on an outer surface of the tubular slipper that is away from the clearance and the at least one ball, the at least one ball providing contact between the coupling member and the tubular slipper, at least one of the rings having a first recess with side walls for receiving the least one ball, the friction surface being configured to be displaced in a radial direction when the at least one ball is axially aligned with the first recess and forced to run up the side walls by rotating the rings relative to one another, and the side walls extending in the common axial direction such that the at least one ball continues to run up the side walls and provide contact between the coupling member and the tubular slipper when one of the rings is displaced in the common axial direction with respect to another one of the rings.

2. The coupling of claim 1, wherein the first recess is a calotte or round cavity.

3. The coupling of claim 1, wherein one of the rings has a bordered flange for limiting the axial movement of the rings.

4. A coupling comprising:
two concentric rings, the rings being movable relative to each other and defining a clearance between them for receiving at least one ball, the first ring being a coupling member, the second ring being a tubular slipper with a friction surface on an outer surface of the tubular slipper that is away from the clearance and the at least one ball, the at least one ball providing contact between the coupling member and the tubular slipper, at least one of the rings having a first recess with side walls for receiving the least one ball, and the friction surface being configured to be displaced in a radial direction when the at least one ball is axially aligned with the first recess and forced to run up the side walls by rotating the rings relative to one another,
wherein at least one of the coupling member and the tubular slipper has a second recess axially disposed from the first recess, and wherein the friction surface is configured to not be displaced in a radial direction when the at least one ball is axially aligned with the second recess and the coupling member and the tubular slipper are rotated relative to one another.

5. The coupling of claim 4, wherein the coupling member, the tubular slipper, or both include the first recess.

6. The coupling of claim 5, wherein the rings include multiple first recesses circumferentially displaced.

7. The coupling of claim 6, wherein the at least one ball is a plurality of balls forming a single row or multiple rows.

8. The coupling of claim 7, wherein the plurality of balls are disposed in a ball cage.

9. The coupling of claim 8, wherein the ball cage is formed of stamped sheet metal.

10. The coupling of claim 5, wherein both rings include the first recess, and the first recesses are radially aligned.

11. The coupling of claim 10, wherein both rings include the first recess and one or both rings includes the second recess.

12. The coupling of claim 4, wherein the side walls of the first recess have an arched shape.

13. A coupling comprising:
two concentric rings, the rings being movable relative to each other and defining a clearance between them for receiving at least one ball, the first ring being a coupling member, the second ring being a tubular slipper with a friction surface on an outer surface of the tubular slipper that is away from the clearance and the at least one ball, the at least one ball providing contact between the coupling member and the tubular slipper, at least one of the rings having a first recess with side walls for receiving the least one ball, and the friction surface being configured to be displaced in a radial direction when the at least one ball is axially aligned with the first recess and forced to run up the side walls by rotating the rings relative to one another,
wherein, in the clearance, at least one cylindrical roller element is placed axially next to the at least one ball, the at least one ball being elastic and having a slighter bigger diameter than the diameter of the at least one cylindrical roller element, so that an axial movement between the rings in an unencumbered condition is carried only by the at least one ball, and a load between the rings in a charged state is carried only by the at least one cylindrical roller element.

14. A method of operating a coupling comprising:
providing a coupling comprising two concentric rings having a common axial direction, the rings being movable relative to each other and defining a clearance between them extending in the common axial direction for receiving a plurality of balls, the first ring being a coupling member, the second ring being a tubular slipper with a friction surface on an outer surface of the tubular slipper that is away from the clearance and the plurality of balls, the plurality of balls providing contact between the coupling member and the tubular slipper;
axially aligning the plurality of balls in a first arched recess of at least one of the coupling member and the tubular slipper;

rotating at least one of the coupling member and the tubular slipper to apply a radial force to at least one of the coupling member and the tubular slipper; and displacing one of the coupling member and the tubular slipper in the common axial direction with respect to another of the coupling member and the tubular slipper, while maintaining the radial force applied to the at least one of the coupling member and the tubular slipper, and while the plurality of balls maintain contact between the coupling member and tubular slipper.

15. The method of claim 14, further comprising:

axially aligning the plurality of balls in a second recess to eliminate the radial force.

\* \* \* \* \*